United States Patent
Grabovski et al.

(10) Patent No.: US 12,086,747 B2
(45) Date of Patent: *Sep. 10, 2024

(54) FLEXIBLE STORE FULFILLMENT

(71) Applicant: Walmart Apollo, LLC, Bentonville, AR (US)

(72) Inventors: Vadim Grabovski, Fayetteville, AR (US); Larry Christopher Venable, Jacksonville, FL (US); John Kevin Collier, Aventura, FL (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/235,704

(22) Filed: Aug. 18, 2023

(65) Prior Publication Data

US 2023/0410009 A1 Dec. 21, 2023

Related U.S. Application Data

(63) Continuation of application No. 17/550,893, filed on Dec. 14, 2021, now Pat. No. 11,775,900, which is a
(Continued)

(51) Int. Cl.
G06Q 10/0631 (2023.01)

(52) U.S. Cl.
CPC . *G06Q 10/06316* (2013.01); *G06Q 10/06311* (2013.01)

(58) Field of Classification Search
None
See application file for complete search history.

(56) References Cited

U.S. PATENT DOCUMENTS

| 5,970,224 A | 10/1999 | Salgado |
| 5,987,422 A | 11/1999 | Buzsaki |

(Continued)

FOREIGN PATENT DOCUMENTS

| CA | 2907578 | 9/2014 |
| GB | 2526231 | 11/2015 |
| WO | 2014150823 | 9/2014 |

OTHER PUBLICATIONS

Canadian Notice of Allowance for Application 2,907,578 Dated Nov. 2, 2018; 1 page.
(Continued)

*Primary Examiner* — Folashade Anderson
(74) *Attorney, Agent, or Firm* — Fitch, Even, Tabin & Flannery, LLP

(57) ABSTRACT

Aspects described herein relate to a flexible order fulfillment management system that utilizes predefined fulfillment workflows including common business processes. By utilizing predefined workflows including common business processes, the order fulfillment management system is able to drive store-based fulfillment programs efficiently as multiple fulfillment workflows may utilize the same common business processes and a single fulfillment management system may operate workflows in parallel. In addition, such an order fulfillment management system may also be more easily adapted for different retail store environments as the system allows a designer to easily create or modify a fulfillment workflow by selecting predefined common business processes or creating any additional custom business processes. Another aspect described herein relates to a tool that allows a designer of an order fulfillment program to select from a group of predefined common business processes to create workflows associated with an order fulfillment program.

20 Claims, 7 Drawing Sheets

Related U.S. Application Data continuation of application No. 15/695,349, filed on Sep. 5, 2017, now Pat. No. 11,227,244, which is a continuation of application No. 13/969,989, filed on Aug. 19, 2013, now Pat. No. 9,779,375.

(60) Provisional application No. 61/798,424, filed on Mar. 15, 2013.

(56) References Cited

U.S. PATENT DOCUMENTS

| | | | |
|---|---|---|---|
| 6,601,233 | B1 | 7/2003 | Underwood |
| 7,499,871 | B1 | 3/2009 | Mcbrayer |
| 7,848,953 | B2 | 12/2010 | Kahlon |
| 8,321,250 | B2 | 11/2012 | Pachter |
| 8,683,473 | B2 | 3/2014 | Maresh |
| 9,779,375 | B2 | 10/2017 | Grabovski |
| 11,010,695 | B2 * | 5/2021 | Hamilton ....... G06Q 10/063114 |
| 11,227,244 | B2 | 1/2022 | Grabovski |
| 11,354,610 | B2 * | 6/2022 | Brand ................... G06N 20/00 |
| 11,775,900 | B2 | 10/2023 | Grabovski |
| 2002/0049622 | A1 | 4/2002 | Lettich |
| 2002/0133387 | A1 | 9/2002 | Wilson |
| 2002/0152001 | A1 | 10/2002 | Knipp |
| 2002/0178037 | A1 | 11/2002 | Reading |
| 2003/0225607 | A1 | 12/2003 | Kopunovic |
| 2004/0088187 | A1 | 5/2004 | Chudy |
| 2005/0171833 | A1 | 8/2005 | Jost |
| 2005/0240625 | A1 | 10/2005 | Chang |
| 2007/0112647 | A1 | 5/2007 | Borders |
| 2007/0156500 | A1 | 7/2007 | Merkel |
| 2008/0046862 | A1 | 2/2008 | Sattler |
| 2009/0132331 | A1 | 5/2009 | Cartledge |
| 2009/0199192 | A1 * | 8/2009 | Laithwaite .......... G06Q 10/109 718/104 |
| 2009/0204470 | A1 | 8/2009 | Weyl |
| 2010/0257015 | A1 | 10/2010 | Molander |
| 2012/0198457 | A1 | 8/2012 | Leonelli |
| 2012/0290523 | A1 | 11/2012 | Malko |
| 2014/0095350 | A1 | 4/2014 | Carr |
| 2014/0279294 | A1 | 9/2014 | Field-Darragh |
| 2014/0359628 | A1 * | 12/2014 | Braham ............. G06Q 10/0631 718/102 |
| 2015/0317582 | A1 * | 11/2015 | Nath ................ G06Q 10/06311 705/7.13 |
| 2017/0213186 | A1 * | 7/2017 | Grifoni ................ G06Q 10/087 |

OTHER PUBLICATIONS

Canadian Office Action for Application 2,907,578 Dated Apr. 13, 2018 pp. 1-10.

Canadian Office Action for Application 2,907,578 Dated Nov. 2, 2018; pp. 1-12.

Gademann et al., Order batching to minimize total travel time in a parallel-aisle warehouse, IIE Transactions, vol. 37, No. 1, pp. 63-75, Jun. 1, 2004.

Henn et al., Order Batching in Order Picking Warehouse: a Survey of Solution Approaches, pp. 1-30, Jan. 2011.

Kreifelts et al., Sharing To-Do Lists with a Distributed Task Manager. Proceedings of the Third European Conference on Computer-Supported Cooperative Work. 16 pages. Sep. 13-17, 1993.

Notification of Transmittal of the International Search Report and the Written Opinion of the International Searching Authority from corresponding PCT/US2014/024325 mailed Jul. 14, 2014.

Pillac et al., Dynamic vehicle routing: Solution methods and computational tools, 40R quarterly journal of the Belgian, French and Italian Operations Research Societies 11(4) Dec. 2013, pp. 1-4.

Sambola et al., Variable Neighborhood Search for Order batching in a Warehouse, Asia-Pacific journal of Operational Research, vol. 26, No. 5, pp. 655-683 Oct. 2009.

UKIPO; App. No. GB1516512.9; Examination Report mailed Nov. 20, 2019; 6 pages.

UKIPO; App. No. GB1516512.9; Examination Report mailed Jun. 19, 2020; 5 pages.

USPTO; U.S. Appl. No. 13/969,989; Notice of Allowance mailed May 31, 2017; 19 pages.

USPTO; U.S. Appl. No. 13/969,989; Office Action mailed Nov. 17, 2016; 41 pages.

USPTO; U.S. Appl. No. 13/969,989; Office Action mailed Feb. 12, 2015; 28 pages.

USPTO; U.S. Appl. No. 13/969,989; Office Action mailed Apr. 7, 2016; 35 pages.

USPTO; U.S. Appl. No. 13/969,989; Office Action mailed Aug. 25, 2015; 36 pages.

USPTO; U.S. Appl. No. 15/695,349; Notice of Allowance mailed Sep. 1, 2021; 10 pages.

USPTO; U.S. Appl. No. 15/695,349; Office Action mailed Jan. 8, 2020; 14 pages.

USPTO; U.S. Appl. No. 15/695,349; Office Action mailed Dec. 23, 2020; 43 pages.

USPTO; U.S. Appl. No. 15/695,349; Office Action mailed Jul. 2, 2020; 35 pages.

USPTO; U.S. Appl. No. 15/695,349; Office Action mailed Jul. 7, 2021; 13 pages.

USPTO; U.S. Appl. No. 17/550,893; Non-Final Rejection mailed Mar. 16, 2023; (pp. 1-16).

USPTO; U.S. Appl. No. 17/550,893; Notice of Allowance and Fees Due (PTOL-85) mailed May 30, 2023; (pp. 1-8).

Verena Schmid and Karl F. Doerner and Gilbert Laporte, "Rich routing problems arising in supply chain management", European Journal of Operational Research, vol. 224, Issue 3, pp. 435-448, <https://www.slideshare.net/siska_suryanto/rich-routing-problems-arising-in-supply-chain-management-2012>, Aug. 30, 2012 (Aug. 30, 2012).

\* cited by examiner

FLEXIBLE STORE FULFILLMENT

RELATED APPLICATION

This application is a continuation of U.S. application Ser. No. 17/550,893, filed Dec. 14, 2021, which is a continuation of U.S. application Ser. No. 15/695,349, filed Sep. 5, 2017, now U.S. Pat. No. 11,227,244, which is a continuation of U.S. application Ser. No. 13/969,989, filed Aug. 19, 2013, now U.S. Pat. No. 9,779,375, which claims the benefit of priority to U.S. Provisional App. No. 61/798,424 filed Mar. 15, 2013, each of which is hereby incorporated by reference in its entirety.

BACKGROUND OF THE DISCLOSURE

Field of the Invention

Aspects of the present invention relate generally to systems and methods for order fulfillment.

Discussion of Related Art

Traditional warehouse-based order fulfillment models are commonly utilized to fulfill orders received from consumers. In such warehouse-based order fulfillment models, an order is created (e.g., online, over the phone, via fax, in-person etc.) and an Order Management System (OMS) identifies a fulfillment center, warehouse, Distribution Center (DC), or other third party managed facility that is responsible for retrieving the order from their stock and shipping the order to the customer.

Store-based fulfillment models are alternatives to the traditional warehouse-based models. Store-based fulfillment models utilize processes within a retail store to fulfill a customer's order. In such store-based fulfillment models, once an order is created, the products listed in the order are retrieved from a retail store's stock and subsequently picked up by the customer at the store, delivered by the store to the customer's home, or shipped through a mail carrier. A store may also serve as an order pickup location for orders that are fulfilled elsewhere and then shipped to the store where the customers may claim them.

SUMMARY

According to one aspect of the present invention described herein, a retail facility fulfillment system provides a desired level of flexibility by using configurable workflows and reusable workflow elements that relate to business process execution steps that are taken within various retail locations. A workflow designer may pick and choose each of these elements to define a particular workflow to be executed at a particular retail location relating to fulfillment. Conventionally, business processes need to be tailored to meet the needs of each fulfillment implementation, and such customization may be different for each fulfillment program or market. According to one embodiment, a tool is provided that allows for reuse of common business process components to create workflows associated with a fulfillment program.

As described herein, a designer of a fulfillment program may select from a group of predefined common business processes stored on the database of a process design system. According to some embodiments, the predefined common business processes may be preloaded on the database, downloaded to the database from a local or non-local source; transmitted to the database, or transferred to the database by any other appropriate method.

By utilizing predefined fulfillment workflows that integrate common business processes, the flexible order fulfillment management system described herein may be able to drive store-based fulfillment programs efficiently as multiple fulfillment workflows may utilize the same common business processes and a single fulfillment management system may operate the workflows in parallel. In addition, such an order fulfillment management system may also be more easily adapted for a variety of different retail store environments and situations, as the engine allows a user to easily create or modify a fulfillment workflow by selecting desired predefined common business processes and creating any additional custom business processes which may be required.

Aspects in accord with the present invention are directed to an order fulfillment system, the system comprising an order fulfillment management system configured to be coupled to a retail store computer system, the order fulfillment management system configured to receive orders from a central order management system and execute fulfillment workflows, a database coupled to the order fulfillment management system, the database including storage for fulfillment operation information including a plurality of predefined fulfillment workflows stored within, each predefined fulfillment workflow including at least one common business process, each common business process including at least one action, a task management system coupled to the order fulfillment management system, and at least one associate device configured to communicate with the task management system, wherein the order fulfillment management system is configured to select one of the plurality of predefined process workflows for each received order, and wherein the task management system is configured to drive the at least one device to instruct a user of the at least one device to perform actions associated with the common business processes of the selected predefined process workflows.

According to one embodiment, the plurality of predefined fulfillment workflows includes a first fulfillment workflow including a first group of predefined common business processes and a second fulfillment workflow including a second group of predefined common business processes, and both the first and second group of predefined common business processes include at least one same common business process. In another embodiment, at least one predefined fulfillment workflow includes at least one custom business process and the task management system is further configured to drive the at least one device to instruct the user of the at least one device to perform actions associated with the common and custom business processes of the at least one predefined process workflow.

According to another embodiment, the at least one device is a portable device configured to display instructions to the user to drive the user to perform actions associated with the common business processes of the selected predefined process workflows. In one embodiment, the at least one device is a handheld device configured to display instructions to the user to drive the user to perform actions associated with the common business processes of the selected predefined process workflows.

According to one embodiment, the task management system is further configured to identify the user based, at least in part, on a characteristic of the user. In one embodiment, the characteristic of the user includes at least one of a qualification of the user and a location of the at least one associate. In another embodiment, the task management system is further configured to identify the user based, at least in part, on a characteristic of a received order. In one embodiment, the characteristic of the received order includes at least one of a time characteristic, environmental characteristic, and temperature characteristic of the received order. In another embodiment, the task management system is further configured to assign actions to a user based, at least in part, on a location of the user. In one embodiment, the task management system is further configured to assign actions to a user based, at least in part, on a time requirement of an order.

Another aspect in accord with the present invention is directed to an order fulfillment system, the system comprising a database including a plurality of predefined common business processes stored within, each predefined common business process including at least one defined action, an input device, and a process design system coupled to the database and the input device, the process design system configured to allow a designer to define a plurality of fulfillment programs by arranging a group of the plurality of common predefined business processes as a sequence of steps, for at least a portion of each one of the plurality of fulfillment programs.

According to one embodiment, the process design system is further configured to be coupled to an order fulfillment management system and to transmit the plurality of fulfillment programs to the order fulfillment management system. In one embodiment, each one of the plurality of fulfillment programs is implemented by the user as a fulfillment workflow including the arranged group of the plurality of common predefined business processes.

According to another embodiment, the plurality of predefined common business processes includes a first predefined common business process including a first set of actions, the plurality of fulfillment programs includes a first fulfillment program defined by a first fulfillment workflow including a first group of predefined common business processes and a second fulfillment program defined by a second fulfillment workflow including a second group of predefined common business processes, and both the first and second groups of predefined common business processes include the first predefined common business process.

According to one embodiment, the database further includes at least one custom business process. In one embodiment, the process design system is further configured to allow a user of the input device to define the fulfillment workflow of at least one of the plurality of fulfillment programs by selecting the at least one custom business process and at least one of the plurality of predefined common business processes.

One aspect in accord with the present invention is directed to a method for fulfilling customer orders, the method comprising acts of selecting, via an input device of a process design system within the distributed computer system, a first group of common predefined business processes from a plurality of common predefined business processes stored in a database coupled to the process design system, each one of the plurality of common predefined business process including at least one action, and defining, via the input device of the process design system, at least a portion of a fulfillment workflow of a first fulfillment program to include the selected first group of common predefined business processes.

According to one embodiment, the method further comprises acts of selecting, via the input device of the process design system, a second group of common predefined business processes from the plurality of common predefined business processes stored in the database, the second group of common predefined business processes including at least one common predefined business process that is also included in the first group of common predefined business processes, and defining, via the input device of the process design system, at least a portion of a fulfillment workflow of a second fulfillment program to include the selected second group of common predefined business processes. In another embodiment, the method further comprises an act of transmitting the first fulfillment program workflow to an order fulfillment management system of a distributed computer system.

According to another embodiment, the method further comprises acts of receiving, at the order fulfillment management system of the distributed computer system, orders provided by an order management system of a retail web site, selecting, with the order fulfillment management system, the fulfillment workflow of the first fulfillment program to fulfill a received order, and assigning, by an task management system, the activities from the defined first group of predefined common business processes of the fulfillment workflow of the selected first fulfillment program to at least one associate of the retail store to fulfill the received order. In one embodiment, the act of assigning the activities to the at least one associate comprises an act of transmitting, from the task management system, at least one instruction related to the activities to a device operated by the at least one associate. In another embodiment, the act of assigning the activities to the at least one associate comprises an act of identifying, with the task management system, the at least one associate based on at least one of a characteristic of the received order and a characteristic of the at least one associate. In one embodiment, the act of identifying the at least one associate based on a characteristic of the at least one associate includes an act of identifying the at least one associate based on at least one of a qualification of the associate and a location of the associate.

According to one embodiment, the method further comprises acts of selecting, via the input device of the process design system, at least one custom business process stored in the database, and defining, via the input device of the process design system, the fulfillment workflow of the first fulfillment program to include the selected first group of common predefined business processes and the selected at least one custom business process. In one embodiment the method further comprises acts of defining, via the input device of the process design system, at least one custom business process, and defining, via the input device of the process design system, the fulfillment workflow of the first fulfillment program to include the selected first group of common predefined business processes and the at least one custom business process.

Another aspect in accord with the present invention is directed to a computer readable medium comprising computer-executable instructions that when executed on a processor performs a method for fulfilling customer orders, the method comprising acts of selecting, via an input device of a process design system within the distributed computer system, a first group of common predefined business processes from a plurality of common predefined business processes stored in a database coupled to the process design system, each one of the plurality of common predefined business process including at least one action, and defining, via the input device of the process design system, at least a portion of a fulfillment workflow of a first fulfillment program to include the selected first group of common predefined business processes.

According to one embodiment, the method further comprises acts of selecting, via the input device of the process design system, a second group of common predefined business processes from the plurality of common predefined business processes stored in the database, the second group of common predefined business processes including at least one common predefined business process that is also included in the first group of common predefined business processes, and defining, via the input device of the process design system, at least a portion of a fulfillment workflow of a second fulfillment program to include the selected second group of common predefined business processes.

According to another embodiment, the method further comprises acts of receiving, at an order fulfillment management system of a distributed computer system, orders provided by an order management system of a retail web site, selecting, with the order fulfillment management system, the fulfillment workflow of the first fulfillment program to fulfill a received order, assigning, by an task management system, the activities from the defined first group of predefined common business processes of the fulfillment workflow of the selected first fulfillment program to at least one associate of the retail store to fulfill the received order, and transmitting, by the task management system, at least one instruction related to the activities to a device operated by the at least one associate.

According to one embodiment, the method further comprises an act of transmitting, by the task management system, a fulfillment status update to the order fulfillment management system related to the assigned activities. In one embodiment, the method further comprises an act of transmitting, by the order fulfillment management system, an order status update related to the received order to the order management system. In another embodiment, the method further comprises an act of transmitting, by the order fulfillment management system at least one performance metric to a reporting system.

According to another embodiment, the method further comprises acts of selecting, via the input device of the process design system, at least one custom business process stored in the database, and defining, via the input device of the process design system, the fulfillment workflow of the first fulfillment program to include the selected first group of common predefined business processes and the selected at least one custom business process. In another embodiment, the method further comprises acts of defining, via the input device of the process design system, at least one custom business process, and defining, via the input device of the process design system, the fulfillment workflow of the first fulfillment program to include the selected first group of common predefined business processes and the at least one custom business process.

According to one embodiment, the method further comprises an act of driving, with the task management system, at least one store system of the retail store to implement at least one of the activities. In one embodiment, the method further comprises an act of receiving, by the task (activity) management system from the at least one store system of the retail store, a task (activity) status update.

BRIEF DESCRIPTION OF DRAWINGS

The accompanying drawings are not intended to be drawn to scale. In the drawings, each identical or nearly identical component that is illustrated in various FIGs. is represented by a like numeral. For purposes of clarity, not every component may be labeled in every drawing. In the drawings.

DETAILED DESCRIPTION

Figure 1:
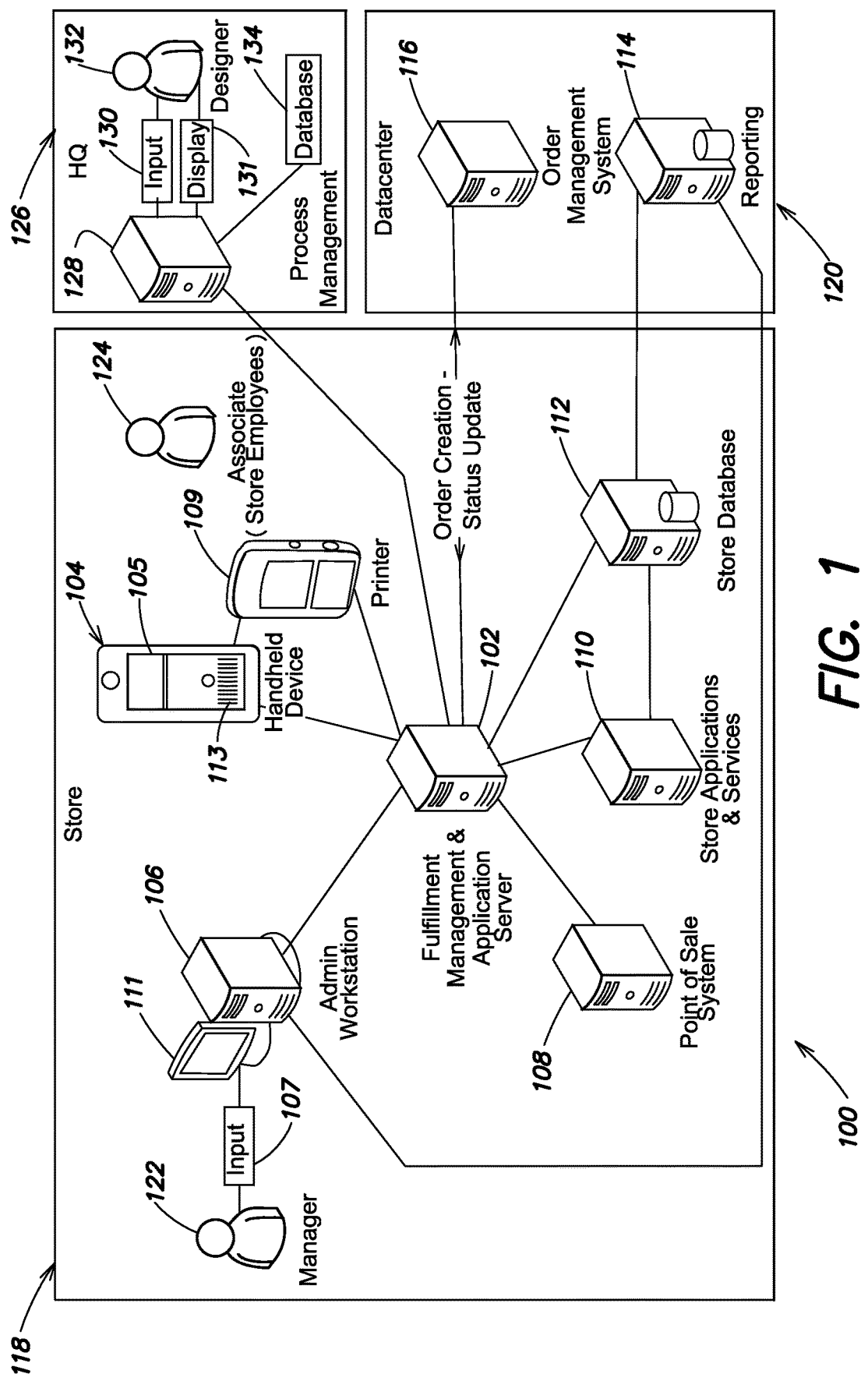
FIG. 1 illustrates an order fulfillment system architecture in accordance with one aspect of the present invention.

Embodiments of the invention are not limited to the details of construction and the arrangement of components set forth in the following description or illustrated in the drawings. Embodiments of the invention are capable of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

As discussed above, store-based fulfillment models are alternatives to the traditional warehouse-based models. Typically, retail stores may be capable of performing a variety of different store-based fulfillment operations and processes based on multiple store-based fulfillment models. For example, some stores may be capable of performing multiple store-based fulfillment models such that, according to the different models, an order placed by a customer may be delivered from a retail store to the customer, prepared for pick-up by a customer after being picked from the retail store stock, after being shipped from another fulfillment facility, or shipped from the retail store to the customer.

Existing store fulfillment systems are typically designed to implement a single fulfillment program within a retail store. Typically, different fulfillment programs are based on different platforms and solutions. Enabling the combination of such multiple fulfillment systems (e.g., to implement multiple fulfillment programs) at the same retail store and coordination between those systems may prove to be cumbersome and inefficient.

For example, a retail store capable of performing operations and processes associated with multiple store-based fulfillment programs (e.g., such as "in store pick-up", "home delivery", and "shipping" fulfillment programs, for example) commonly includes multiple independent computer modules, each capable of driving the operations and processes associated with a single store-based fulfillment program. Incompatibility and lack of synchronization between a large number of computer modules necessary to perform various store-based fulfillment operations and processes (supporting various store-based fulfillment programs), working independently of each other, increase cost and complexity. In addition, such a system may prove inflexible to changing or new operations as such systems are typically tailored to a specific fulfillment process flow and/or a specific type of facility.

Accordingly, embodiments described herein provide a flexible and more efficient order fulfillment management system that is configured to support multiple order fulfillment programs at a retail store and capable of driving the process of fulfilling customer orders through multiple predefined workflows. Each workflow controls the fulfillment management system so that it orchestrates execution of an associated fulfillment program by engaging software components. The software components implement specific order fulfillment business processes. Each business process is implemented as a business process workflow. Unlike fulfillment workflows that arrange business processes in a sequence, a business process workflow is a lower level workflow in the fulfillment system 100 that implements a business process itself. Each element in a business process workflow represents either a task that an associate performs, a condition check that defines conditional logic, or a system action. The business process workflow connects these various tasks together into a workflow. Each business process has an associated software module that uses lower level software components to implement logic for different tasks or activities of the business process workflow (e.g., the scanning of an item, the verification of an item using an identification code, etc.).

Applicants have appreciated that fulfillment workflows associated with some store-based fulfillment programs that are otherwise unrelated, may include some of the same business processes. For example, the fulfillment workflows of a retail store associated with certain store-based fulfillment programs (e.g., in-store pick-up, home delivery, and shipping etc.) may each include a "Pick" business process that directs an associate within the retail store, through defined actions in a "Pick" business process workflow, to retrieve products listed in the order from the store's inventory. The "Pick" business process is associated with almost every store-based fulfillment program (e.g., in-store pick-up, home delivery, and shipping) as the tasks associated with the "Pick" business process (e.g., retrieving the order from a shelf or backroom and scanning the picked product) must be completed for each one of those store-based fulfillment programs.

According to other embodiments, some additional business processes common amongst store-based fulfillment programs include a "Stage" business process (in which an order is temporarily stored for further processing), an "Audit" business process (in which an order is reviewed), a "Load" business process (in which an order is loaded into a vehicle or a trailer), a "Pack" business process (in which an order is packed into a box), a "Ship" business process (in which an order is placed with a shipping carrier), a "Deliver" business process (in which an order is delivered by a store to the customer), and a "Pickup" business process (in which an order is dispensed to the customer during in-store pickup). According to other embodiments, any other type of common business process utilized by multiple store-based fulfillment programs may be defined.

The common business processes (and their associated business process workflows and corresponding software components), as discussed above, may be combined in any number of various ways to form fulfillment workflows to accomplish specific store-based fulfillment programs. For example, according to one embodiment, an "in-store pickup" fulfillment program of a retail store is associated with a fulfillment workflow including the common "Pick", "Stage", and "Pickup" business processes. Based on this workflow (and the business process workflows associated with the "Pick", "Stage", and "Pickup" business processes), an associate at the retail store would retrieve the order from inventory, put the order into designated area for storing, and retrieve the order to be dispensed to the customer.

According to another embodiment, a "home delivery" fulfillment program of a retail store is associated with a fulfillment workflow including the common "Pick", "Stage", "Load", and "Deliver" business processes. Based on this workflow, an associate at the retail store would retrieve the order from inventory, prepare the order for further processing, load the order onto a delivery vehicle, and deliver the order to the customer. As can be seen above, the "in-store pickup" fulfillment program and the "home delivery" fulfillment program both include the common "Pick" and "Stage" business processes. According to other embodiments, a store-fulfillment program may be defined by combining several common business processes, in any number of ways, into a fulfillment workflow.

By utilizing defined fulfillment workflows that integrate common business processes (and their corresponding business process workflows and associated software components), the flexible order fulfillment management system may be able to drive store-based fulfillment programs more efficiently and may also be more easily adapted for a variety of different retail store environments and situations.

As described above, fulfillment workflows that integrate common business processes may be utilized by an order fulfillment management system to drive fulfillment programs to fulfill customer orders. For example, FIG. 1 illustrates an order fulfillment system 100 in accordance with aspects described herein. The order fulfillment system 100 includes a fulfillment management & applications server 102, one or more portable devices 104, an administration system 106, a Point of Sale (POS) system 108, a store applications & services server 110, a store database 112, a reporting component 114, an order management system 116, a process design system 128, and a process design system database 134.

The fulfillment management & applications server 102 is coupled to the administration system 106, the store database 112, the store applications & services server 110, the POS system 108, one or more portable devices 104, and the process design system 128. The store database 112 is also coupled to the store applications & services server 110 and the reporting component 114. The fulfillment management & applications server 102 is also coupled to the order management system 116. The process design system 128 is also coupled to the process design system database 134.

According to one embodiment, the fulfillment management & applications server 102, portable devices 104, administration system 106, Point of Sale (POS) system 108, store applications & services server 110, and store database 112 are located within a retail store 118, while the reporting component 114 and the order management system 116 are operated within a data center 120. According to another embodiment, some store components (e.g., the fulfillment management and applications server 102) can be located within the datacenter 120 and operated remotely from store. According to one embodiment, the process design system 128 and process design system 128 database 134 are located at a central control center (e.g., such as corporate headquarters 126); however, in other embodiments, the process design system 128 and process design system 128 database may be located at a different location such as within a retail store 118 or datacenter 120. Additionally, according to a least one embodiment, some server-based system components shown as located at a store may be moved into the data center 120 to perform their functions remotely.

The order management system 116 is configured to receive orders placed by a consumer (e.g., via a website operated by the data center 120). The orders received by the order management system 116 are forwarded to the fulfillment management and applications server 102 via a network (such as a corporate network or the Internet). The POS system 108 includes controllers that run a virtual register that records sales and calculates totals for orders received by the fulfillment management & applications server 102. According to one embodiment, each order is linked to a specific fulfillment program (e.g., selected by the consumer or assigned by the order management system 116) and a corresponding fulfillment workflow.

According to one embodiment, fulfillment workflows for different store-based fulfillment programs are created by a designer 132 at the process design system 128 based on desired fulfillment program requirements. For example, in one embodiment, the designer 132 utilizes an input device 130 (e.g., a keyboard, mouse, touch screen etc.) of the process design system 128 to create (or modify) a fulfillment workflow to accomplish a specific store-based fulfillment program. Workflows created or modified at the process design system 128 are transmitted to the fulfillment management & applications server 102. According to one embodiment, any new or modified fulfillment workflow, upon release to production, is automatically transmitted from the process design system 128 to the fulfillment management & applications server 102. In another embodiment, updates including any newly created or modified workflows are transmitted to the fulfillment management & applications server 102 at predefined intervals.

According to one embodiment, the fulfillment workflows created by the designer 132 at the process design system 128 include common business processes (and their associated business process workflows), as described above, that are reusable and capable of being utilized in multiple workflows. For example, according to one embodiment, the designer 132 may utilize the input device 130 and a business process design application of the process design system 128 to define a fulfillment workflow for a retail store by selecting from a plurality of predefined common business processes stored in the process design system database 134 and arranging them into a process flow. According to one embodiment, the business process design application of the process design system includes a Graphical User Interface (GUI), provided on a display screen 131 of the process design system 128, that displays a plurality of predefined common business processes and allows the designer to select, via the input device 130, the appropriate predefined common business processes to define a fulfillment workflow of a fulfillment program.

For example, according to one embodiment, where a designer 132 desires to define a "ship from store" fulfillment program for a retail store, the designer 132 may operate the GUI to select a plurality of predefined common business processes to define the fulfillment workflow associated with the "ship from store" fulfillment program. In one embodiment, the designer 132 defines the fulfillment workflow of the "ship from store" fulfillment program by selecting the common "Pick", "Stage", "Pack", "Ship", and "Load" business processes. In such a program, the business process workflows associated with the common "Pick", "Stage", "Pack", "Ship", and "Load" business processes would result in the order being picked from inventory, prepared for further processing, packed, prepared for shipping (e.g., affixed with a shipping label), and loaded onto the delivery vehicle (e.g., a third party carrier).

According to one embodiment, a designer 132 may also create a fulfillment workflow including a custom business process, if necessary. According to one embodiment, a custom business process is unique to a specific fulfillment program and is not common amongst multiple fulfillment programs. For example, while creating a desired workflow for a fulfillment program, a designer 132 may request development of software components that implement the workflow of a desired business process. Once the software components associated with the custom business process are made available in the process design system, a designer may utilize the input device 130 of the process design system to select the custom business process (shown on the display 131) to address a unique fulfillment situation associated with the fulfillment program.

According to some embodiments, such a custom business process may be required for a fulfillment program for a retail store where a predefined common business process is inappropriate for the technology capabilities of the retail store, for the culture of the population in which the store is located, for variation of technical capabilities available at the store, for the unique nature of the tasks to be taken in the business process, or for any other unique situation.

According to one embodiment, custom business processes are stored in the process design system database 134 and made available for selection when the designer 132 is selecting business processes to define a desired fulfillment workflow. In one embodiment, custom business processes are defined by the designer 132 at the process design system via the input device 130 and stored in the database 134. Such a scenario may apply when the new custom business process results from the creation of a new business process workflow without the need for creation of new software modules. In another embodiment, custom business processes (and their associated business process workflows) are defined using new or modified software components by an information systems department (e.g., at another system and/or location). The custom business processes are transmitted to the process design system 128 and stored in the database 134 (thereby making the custom business process available for selection by the designer 132). The designer 132 may then utilize the custom business process in a fulfillment workflow.

For example, in one embodiment, a developer at a corporate Information Technology (IT) services department (located at a different location then a store) may create a custom software component required to operate market-specific store equipment and transmit the associated software components to the process design system 128 and the database 134, thereby allowing the designer 132 of a fulfillment program for the specific market to define and select the custom business process as part of the fulfillment workflow for the fulfillment program.

According to one embodiment, the workflow of a fulfillment program defined by a designer 132 may include predefined common business processes and/or custom business processes. According to one embodiment, custom business processes and workflows of fulfillment programs defined by the designer 132 are deployed (i.e., transmitted) to the fulfillment management & applications server and stored, with any required configuration parameters, in the store database 112.

Based on an order received from the order management system 116, the order fulfillment management engine within the fulfillment management & applications server 102 selects an appropriate fulfillment program and associated predefined fulfillment workflow, from the database 112, to fulfill the received order. Upon identification of the appropriate fulfillment program based on the order type, the order fulfillment management engine selects the appropriate predefined fulfillment workflow. The order fulfillment management engine initiates fulfillment tasks based on the business processes included in the fulfillment workflow by sending task requests to the Task Management system software components to implement the fulfillment business processes of the selected predefined fulfillment workflow.

According to one embodiment, the order fulfillment management engine within the fulfillment management & applications server 102 operates at least one portable device 104 to implement the fulfillment business processes of the selected predefined fulfillment workflow. According to one embodiment, the portable device 104 is a handheld device 104 including a display 105. For example, in one embodiment, based on the selected fulfillment program and associated fulfillment workflow, the order fulfillment management engine within the fulfillment management & applications server 102 operates the handheld device 104 to instruct a user 124 (e.g., via the display 105) of the handheld device 104 (e.g., an associate 124 of the retail location) to perform certain tasks corresponding to the business processes in the selected fulfillment workflow (e.g., retrieve an item, package item for shipping, deliver an item, etc). In one embodiment, the order fulfillment management engine operates the handheld device 104 to provide step-by-step instructions to the associate 124 to complete tasks corresponding to the business processes in the selected fulfillment workflow.

According to other embodiments, the order fulfillment management engine within the fulfillment management & applications server 102 may utilize another type of portable device 104 to implement the fulfillment business processes of the selected predefined fulfillment workflow. For example, in one embodiment, the order fulfillment management engine may provide an associate 124 with a list of necessary tasks (e.g., via a printout from a printer or a display screen) to be completed based on the business processes of the selected fulfillment workflow. In other embodiments, the order fulfillment management engine may provide an associate 124 with instructions via some other type of interface or device capable of communicating with the order fulfillment management engine. According to other embodiments, any other appropriate method for providing tasks or instructions to an associate may be utilized.

According to one embodiment, the order fulfillment management engine is configured to drive multiple order fulfillment workflows of multiple fulfillment programs in parallel to fulfill multiple orders. For example, in one embodiment, the order fulfillment management engine is configured to operate the portable device 104 to instruct a user 124 of the portable device 104 to perform tasks corresponding to business processes of multiple selected fulfillment workflows of multiple fulfillment programs (i.e., corresponding to multiple orders). In another embodiment, the order fulfillment management engine is configured to operate multiple portable devices 104 simultaneously to instruct users 124 of the portable devices 104 to perform tasks corresponding to business processes of one or more fulfillment workflows of one or more fulfillment programs corresponding to one or more orders.

In one embodiment, the tasks corresponding to multiple business processes of multiple fulfillment workflows provided to an associate are provided independently. For example, in such an embodiment, where tasks corresponding to a first workflow of a first fulfillment program and a second workflow of a second fulfillment program (i.e., dual orders) are being provided to a user 124, the portable device 104 may first provide all of the instructions related to the first workflow to the portable device 104 before providing instructions related to the second workflow.

However, according to one embodiment, the instructions of a first and a second workflow of a first and a second fulfillment program may be provided to the portable device 104 based on other relevant information. In one embodiment, the current instructions being provided to a portable device 104 may be selected based on the selected workflow(s) currently being driven and a characteristic of the user of the portable device 104, such as the location of the user. For example, if the user 124 is currently located in one of the aisles of the retail store and is retrieving an item per a "Pick" business process of the first workflow, the next instruction sent to the portable device 104 by the order fulfillment management engine may be a "Pick" business process of the second workflow, rather than the next subsequent instruction in the first workflow, as the user 124 is already at the location where the "Pick" business process of the second workflow must be completed. In other embodiments, the current instructions being provided to a portable device 104 may be based on some other characteristic of the user 124 such as the qualifications of the user 124 or the current task being performed by the user 124.

In another embodiment, the current instructions being provided to a portable device 104 may be selected based on the selected workflow(s) currently being driven and the time sensitive nature of at least one of the orders being fulfilled by the selected workflow(s). For example, according to one embodiment, where at least one of the orders must be completed within a certain time frame, the order fulfillment management engine may send instructions to a portable device 104 to ensure that the time-sensitive order is completed on time.

According to one embodiment, the reporting component 114 is configured to receive updates from the order fulfillment management engine within the fulfillment management & applications server 102 and the store database 112, the updates reporting on the status of orders and fulfillment programs (and associated fulfillment workflows) currently being driven by the order fulfillment management engine.

The administration system 106 is configured to allow a user 122 (e.g., a store manager in charge of the order fulfillment system 100) via an input device 107 (e.g., a keyboard, mouse or other input device) of the administration system 106 to control operation of the fulfillment system 100. A manager 122 can utilize an application provided by the administration system 106 to observe status of an order, assign employees to specific types of tasks, and perform other operations related duties. According to one embodiment, the administration system 106 includes a Graphical User Interface (GUI) provided on a display screen 111 of the administration system 106 that allows the user to perform system administration tasks via various input devices, like a keyboard, a mouse, touch screen or other input device.

Figure 2A:
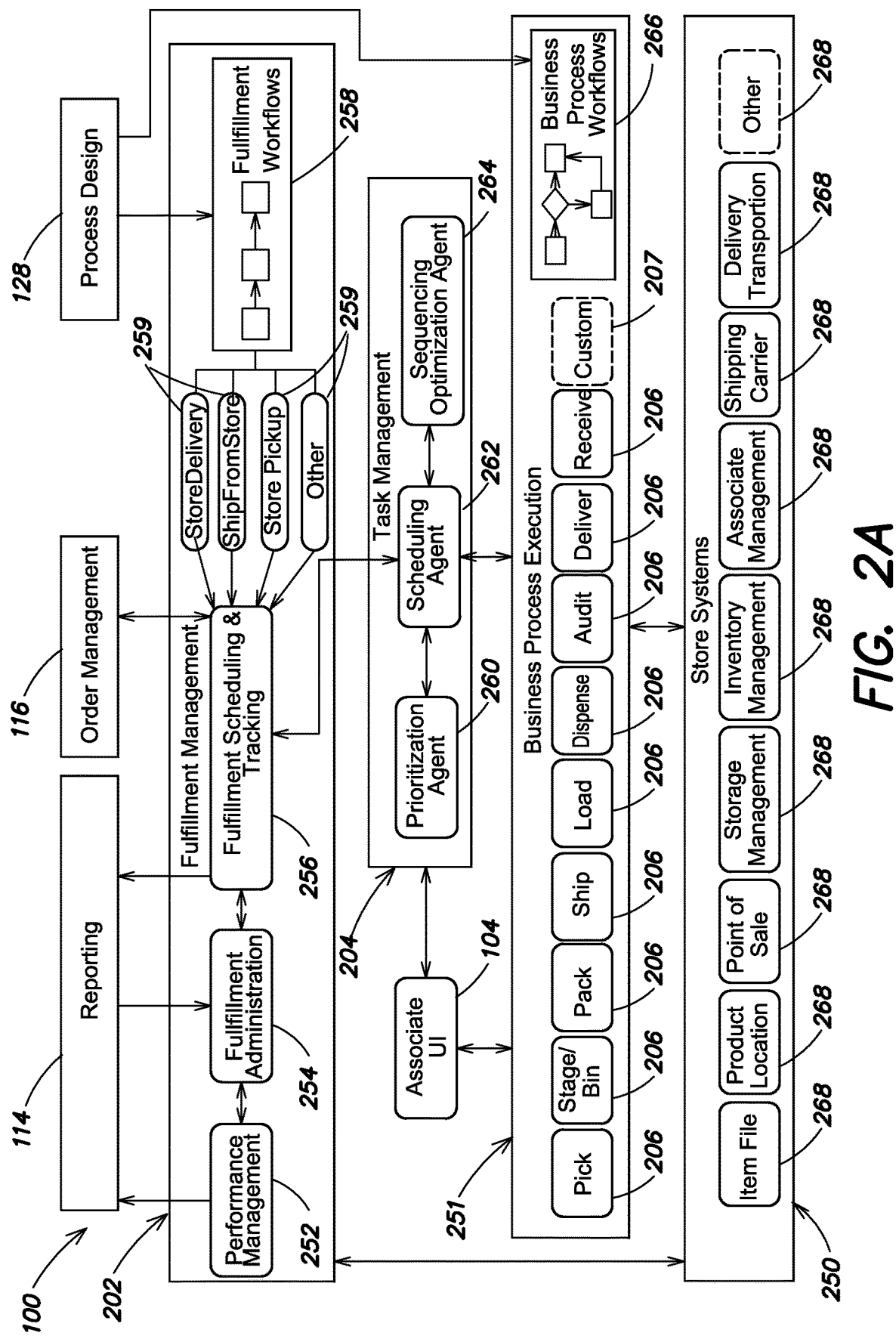
FIG. 2A is a component architecture diagram illustrating an order fulfillment system in accordance with one embodiment of the present invention.

The order fulfillment system 100 is described in greater detail below with regards to FIG. 2A. FIG. 2A is a component architecture diagram of an example order fulfillment system (e.g., system 100). As seen in FIG. 2A, the order fulfillment system 100 interacts with the order management system 116, and includes an order fulfillment management engine 202, the reporting component 114, an activity (or task) management system 204, a business process execution system 251, a process design system 128. The order fulfillment system 100 may also interact with a variety of different store systems 250.

The fulfillment management engine 202 includes a performance management component 252, a fulfillment administration component 254, and a fulfillment scheduling and tracking component. The performance management component 252 is coupled to both the reporting component 114 and the fulfillment administration component 254. The fulfillment administration component 254 is also coupled to the reporting component 114 and the fulfillment scheduling and tracking component 256. The fulfillment scheduling and tracking component 256 is also coupled to the reporting component 114, the order management system 116 and the process design (and/or design) component 128.

The task (or activity) management system 204 includes a prioritization agent 260, a scheduling agent 262 and a route optimization agent 264. The prioritization agent 260 is coupled to the scheduling agent 262. The scheduling agent 262 is coupled to the fulfillment scheduling and tracking component 256 and the route optimization agent 264.

The business process execution system 251 is coupled to the task management system 204 to control execution of common business processes 206 and custom business processes 207. The business process execution system 251 is coupled to the process design system 128 to receive updates for the common and custom business processes 206 and 207. Common and custom business processes 206 and 207 and the fulfillment management engine 202 are integrated with the variety of different store systems 250.

As described above, a designer 132 may utilize the process design system 128 (as seen in FIG. 1) to define order fulfillment workflows 258 of fulfillment programs 259 (e.g., "StoreDelivery," "ShipFromStore," "Store Pickup," "Other," as seen in FIG. 2A) by including common and custom business processes 206, 207 (and their corresponding business process workflows). According to one aspect of the present invention, a designer is provided the capability to pick and choose any of the common and custom business processes 206, 207 to define a particular fulfillment workflow to be executed at a retail location. According to one embodiment, the retail location is selected to participate in a particular fulfillment program via a GUI based process design application tool of the process design system 128.

Conventionally, business processes need to be tailored to meet the needs of a particular fulfillment program or specific market implementation, and such customization may be different for each fulfillment program or market. A custom business process 207 that implements such custom business process logic is developed and provided to the designer 132 by an Information Technology department for inclusion into a fulfillment workflow 258. For example, where a retail store is located in a country with a population that has specific cultural requirements with regards to package delivery, a special custom business process 207 may be required within a fulfillment program 258 to drive an associate to perform special tasks with regards to package deliveries from that specific retail store. As another example, where a retail store has technological limitations, special custom business processes 207 (including special tasks) may be required in a fulfillment program 258 for that store in order to accommodate the limitations of the store. Predefined common business processes 206, predefined common business processes of predefined business fulfillment workflows 266, and custom business processes 207 may be integrated together within fulfillment workflows to implement any type of required order-fulfillment program.

For example, as shown in FIG. 2A, the designer 132 may define the order fulfillment workflow 258 of the fulfillment program by selecting from a group of predefined common business processes 206 including "Audit", "Pick", "Stage", "Pack", "Ship", "Deliver", "Receive", "Load" and "Pickup" business processes 206 and/or custom business processes 207. Business processes are arranged into a sequence that represents a fulfillment workflow 258. According to other embodiments, the group of predefined common business processes 206 and custom business processes 207 may include any number of components representing any type of business process. The business processes 206 are considered common business processes as they are reusable and available for utilization within multiple order-fulfillment workflows of multiple fulfillment programs. The business processes 207 are considered custom business processes if they have low potential for reuse in multiple order fulfillment workflows.

According to some embodiments, a common business process 206 or custom business process 207 may be defined to include any number and/or type of actions to be performed in order to perform a business function associated with the business process. According to one embodiment, the task management system is utilized to drive personnel within the retail location to perform certain tasks related to fulfillment operations. Such tasks may be performed such that fulfillment within the retail location may be accomplished.

The designer 132 at the process design system 128 may select any of the predefined common business processes 206 or predefined custom business processes 207 and arrange them in an order or configuration (e.g., via the input 130 and display 131 of the process design system 128) to define a desired order fulfillment workflow of a fulfillment program.

For example, in one embodiment, a fulfillment workflow of a "home delivery" fulfillment program may be defined with the "Pick", "Stage", "Load", and "Deliver" common business processes 206 (and corresponding business process workflows) as discussed above. In another embodiment, a fulfillment workflow of a "pickup in store" fulfillment program may be defined with the "Pick", "Stage", and "Pickup" common business processes discussed above. In another embodiment, a fulfillment workflow of a "ship from store" fulfillment program may be defined with the "Pick", "Stage", "Pack", and "Ship" common business processes discussed above. According to other embodiments, any of the common business processes may be defined in any configuration to create any desired fulfillment workflow.

According to one embodiment, the fulfillment workflows of fulfillment programs (including common 206 and/or custom 207 business processes) defined by the designer 132 at the process design system 128 are transmitted to the order fulfillment management engine 202 of a store and stored in a database.

Once the order fulfillment workflows of fulfillment programs are deployed at the order fulfillment management engine 202 of a retail store, the order fulfillment system 100 of the retail store awaits orders from the order management system 116. According to one embodiment, the order management system 116 receives orders from a website associated with the retail store. However, in other embodiments, the order management system 116 may receive orders from another source (e.g., via telephone, via fax, via mail, in person, via the POS system 108 etc). The order management system 116 transmits the customer order to the fulfillment scheduling and tracking module of the order fulfillment management engine 202.

Based on the received order, the fulfillment scheduling and tracking module 256 selects an appropriate predefined order fulfillment program and associated fulfillment workflow 258 (from the store database 112) to fulfill each one of the received orders. Based on the selected fulfillment program and associated order fulfillment workflows 258, the fulfillment scheduling and tracking module 256 orchestrates execution of the fulfillment program and associated fulfillment workflows 258 through the task (or activity) management system 204, instructing the task management system 204 to implement the business processes (common 206 and custom 207) in the business process execution system 251 that are associated with the order fulfillment workflows 258 of the selected fulfillment program.

Based on the fulfillment workflows 258 selected by the fulfillment scheduling and tracking module 256 (and the corresponding business processes 206, 207 within the business process execution system 251), the scheduling agent 262 of the task management system 204 determines which tasks or steps should currently be performed to implement the business processes 206, 207 of the selected order fulfillment workflows 258. In one embodiment, the scheduling agent 262 generates tasks that are submitted into a task management queue of tasks or steps to be performed in order to implement the business processes 206, 207 the selected order fulfillment workflows 258.

According to one embodiment, scheduling (or assignment) of tasks or activities to the associates in the task management system is performed by the scheduling agent 262. According to one embodiment, the scheduling is based, at least in part, on task prioritization information received from the prioritization agent 260 and sequencing optimization agent 264. For example, the scheduling agent 262 may schedule tasks with shorter deadlines prior to the tasks that have later deadlines. According to another embodiment, the schedule or queue generated by the scheduling agent 262 is based, at least in part, on route information received from the sequencing optimization agent 264. For example, the sequencing optimization agent 264 may arrange tasks into a sequence based on the location where the tasks must be completed and provide the sequence to the scheduling agent 262, thus defining an execution sequence for tasks that have the same or close due time.

The task management system 204, based on the assignment generated by the scheduling agent 262, works with the variety of business processes 206, 207 of the selected order fulfillment workflows 258. For example, according to one embodiment, the business process execution system 251 engages common and custom business processes 206 and 207 to drive at least one portable device (e.g., a handheld device 104) to provide directions to an associate to instruct the associate to perform the tasks, activities or steps necessary to execute a business process (e.g., common 206 or custom 207) of the selected order fulfillment workflow 258. In another embodiment, common 206 or custom 207 business processes may interact with an external system 268 (e.g., such as a shipping or transportation system) to implement an action of a business process. In other embodiments, the common 206 or custom 207 business process also interacts with a variety of different store systems 268 to receive information which may be required to fulfill the selected order fulfillment workflows 258. For example, common 206 or custom 207 business process may interact with a Point of Sale system 108 to record sale transactions related to an order. In other embodiments, common 206 or custom 207 business process may interact with any type of store system 268.

Figure 2B:
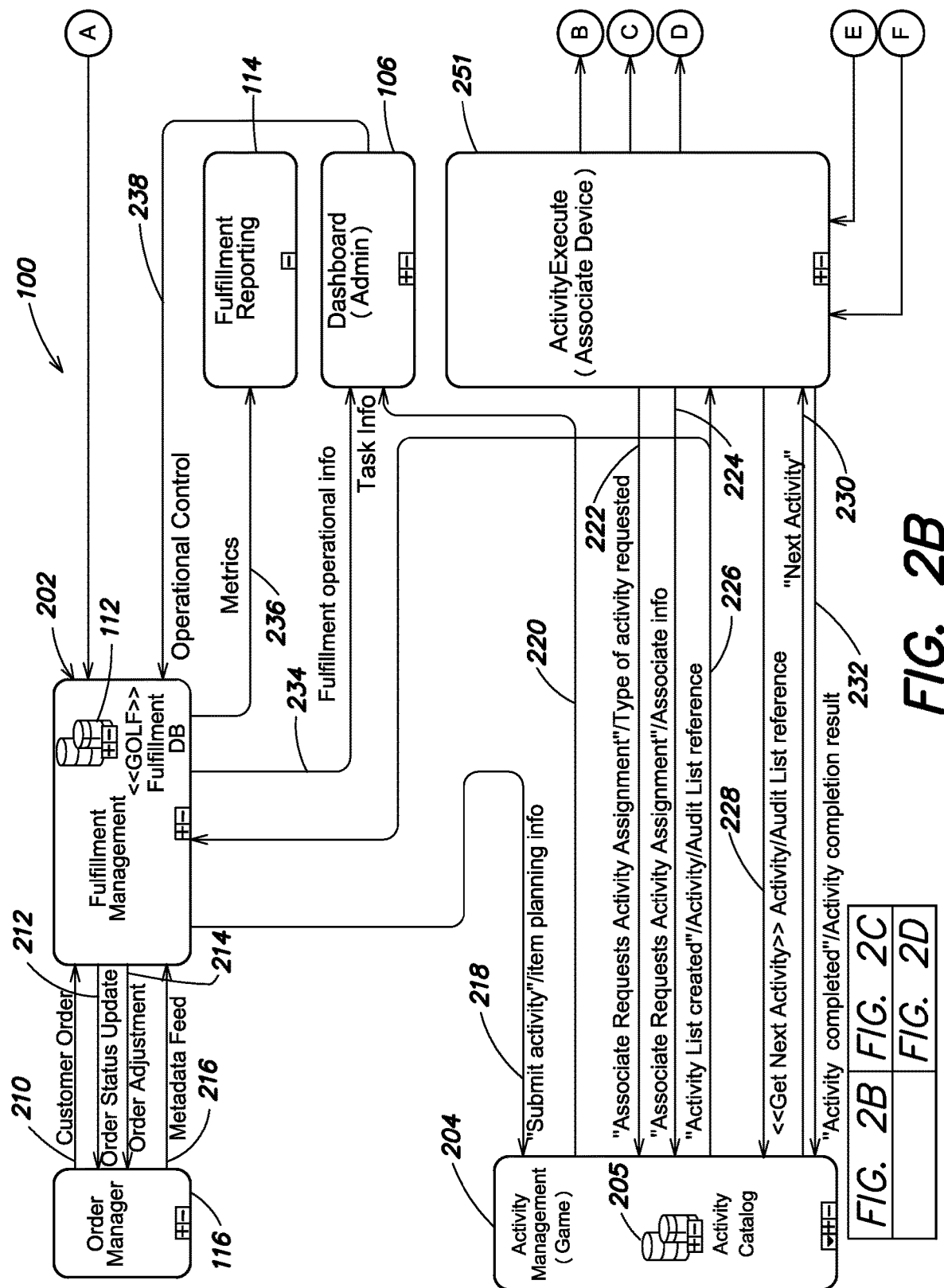
FIGS. 2B-2D illustrate is a component interactions diagram illustrating operation of an order fulfillment system in accordance with one embodiment of the present invention.
Figure 2C:
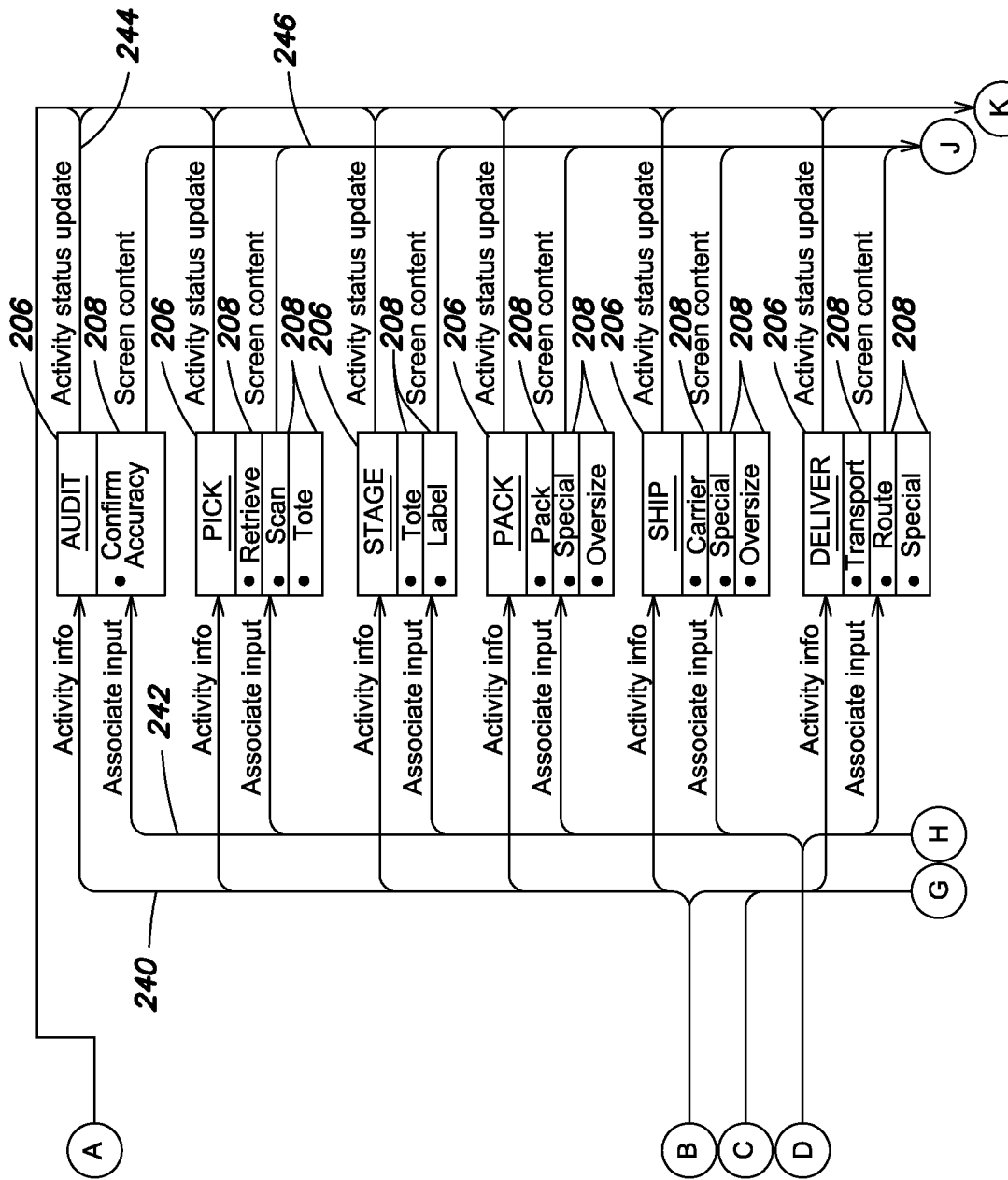
Figure 2D:
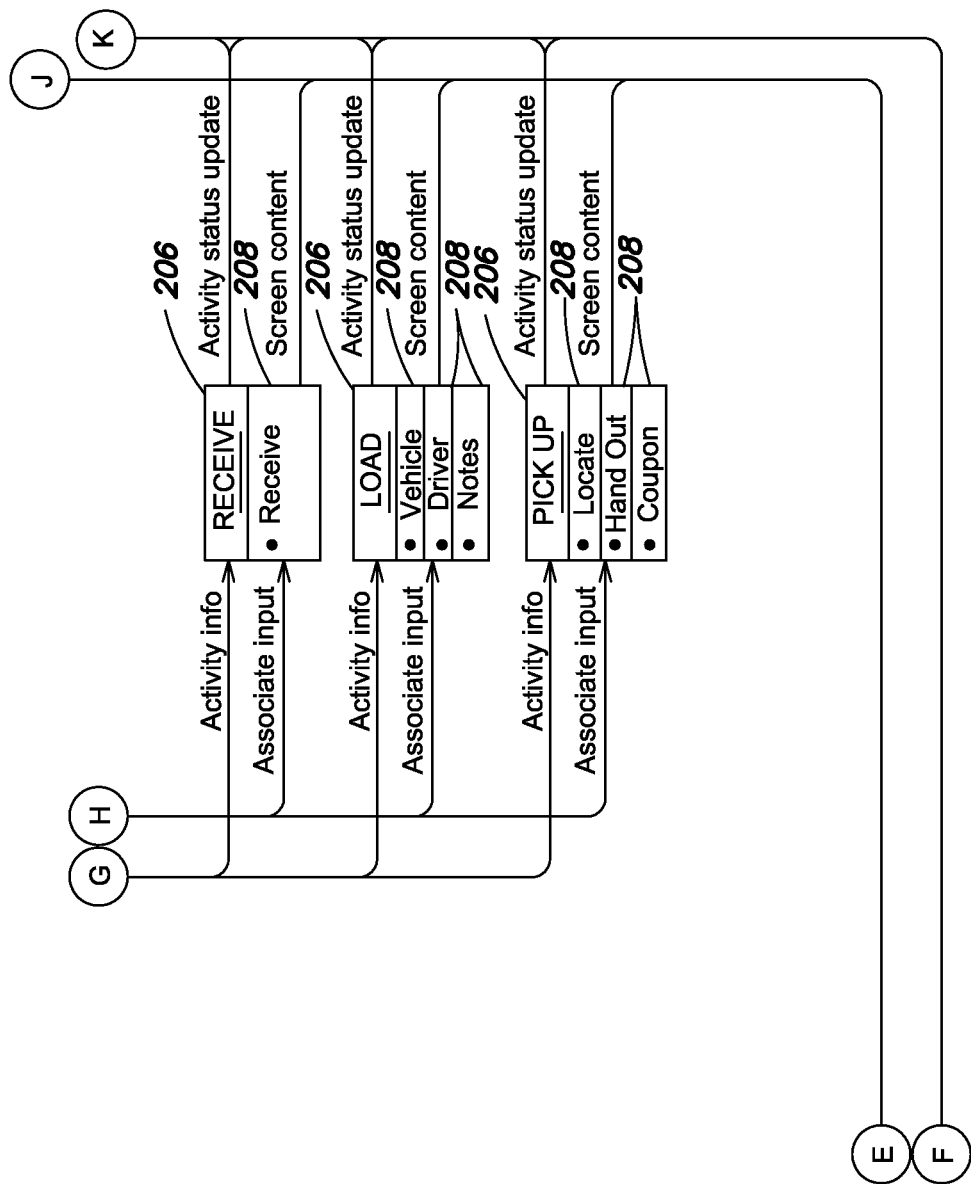

The operation of the fulfillment management system 100 is described in greater detail below with regards to FIG. 2B. FIG. 2B is a flow diagram illustrating operation of the fulfillment management system 100. As seen in FIG. 2B, the fulfillment management system 100 interacts with the order management system 116, the fulfillment management engine 202, the administration system 106, the reporting component 114, a task management system 204, a business process (or task) execution component 251, and the store database 112.

The order management system 116 is coupled to the fulfillment management engine 202. The fulfillment management engine 202 is coupled to the reporting component 114, the administration system 106, and the task (or activity) management system 204. The business process execution component 251 is coupled to the portable device 104. The portable device 104 is coupled to the software components 206, 207 that implement common and custom business processes.

As described above, a designer 132 may utilize the process design system 128 (as seen in FIG. 1) to define order fulfillment workflows of fulfillment programs, that include common business processes 206 and custom business processes 207. According to one embodiment, the designer 132 utilizes the process design system 128 (e.g., via a GUI based process design application tool of the process design system 128) to define an order fulfillment workflow of a fulfillment program by selecting from predefined common business processes 206 or custom business processes 207 stored in the process design database 134. For example, as shown in FIG. 2B, the designer 132 may define the order fulfillment workflow of the fulfillment program by selecting from a group of predefined common business processes 206 including "Audit", "Pick", "Stage", "Pack", "Ship", "Deliver", "Receive", "Load" and "Pickup" business processes 206. According to other embodiments, the group of predefined common business processes 206 may include any number of business processes and/or any other type of business process. The business processes 206 are considered common business processes as they are reusable and available for utilization within multiple order-fulfillment workflows of multiple fulfillment programs.

According to one embodiment, each one of the common business processes 206 or custom business processes 207 is defined as a business process workflow 266 that includes at least one action 208 to be performed by an associate of the retail store to implement the business process. A task is an instance of execution of a business process. Each task includes at least one action 208 which is a function that can generally be completed with one type of movement, (e.g., a pick movement, count movement, put movement etc.). One example of an action is seen in relation to a "Pick" business process implemented in a "Pick" business process workflow that includes actions 208 of picking an item from a store shelf, verifying the item via scanning a code on the item, and placing the item into a tote or other container. According to some embodiments, each common business process 206 may be defined to include any number and/or type of actions 208.

For example, in one embodiment, the "Audit" business process 206 includes a single "Confirm Accuracy" action 208 that instructs an associate to confirm the accuracy of an order. According to another embodiment, the "Pick" business process 206 includes a "Retrieve" action 208 that instructs an associate to retrieve an item from inventory, a "Scan" action 208 that instructs the associate to scan a barcode of the retrieved item to confirm that the right item has been picked, a system action task that validates the entered code against the expected code and quantity a conditional logic task that causes the system to report an audit failure if the values do not match, and a "Tote" action 208 that instructs the associate to place the item in a specific tote or other container.

According to one embodiment, the "Stage" business process 206 includes a "Bin" action 208 that instructs an associate to retrieve a tote (or other container) associated with an order, and place it into a storage location or bin, a "Scan" action 208 that instructs the associate to scan a barcode of the tote to confirm that the right tote has been retrieved, and a "Label" action 208 that instructs the associate to print a tote label on a portable printer 109 and affix it to the tote. According to one embodiment, the "Pack" business process 206 includes a "Pack" action 208 that instructs an associate to put items of an order (e.g., items within a tote associated with the order) into a shipping box, a "Special" task that instructs the associate to confirm whether any items within the order require special packaging (e.g., because an item is environmental hazardous, fragile, must be maintained at a certain temperature, etc), and a "Oversize" task that instructs the associated to confirm whether any items within the order are oversized and require oversized packaging.

The designer 132 at the process design system 128 may select any of the predefined common business processes 206 stored in the process design database 134 and arrange the selected predefined common processes 206 in any order or configuration (e.g., via the input 130 and display 131 of the process design system 128) to define a desired order fulfillment workflow of a fulfillment program. For example, in one embodiment, a fulfillment workflow of a "home delivery" fulfillment program may be defined with the "Pick", "Stage", "Load", and "Deliver" common business processes discussed above. In another embodiment, a fulfillment workflow of a "pickup in store" fulfillment program may be defined with the "Pick", "Stage", and "Pickup" common business processes discussed above. In another embodiment, a fulfillment workflow of a "ship from store" fulfillment program may be defined with the "Pick", "Stage", "Pack", and "Ship" common business processes discussed above. According to other embodiments, any of the common business processes may be defined in any configuration to create a desired fulfillment workflow.

According to one embodiment, as discussed above, the designer 132 at the process design system 128 may also select and/or define a custom business process that is unique to a specific situation and fulfillment program. For example, where a retail store is located in a country with a population that has specific cultural requirements with regards to package delivery, a special custom business process may be required within a fulfillment program to drive an associate to perform special tasks with regards to package deliveries from that specific retail store. As another example, where a retail store has technological limitations, special custom business processes (including special tasks) may be required in a fulfillment program for that store in order to accommodate the limitations of the store. Predefined common business processes 206 and custom business processes may be integrated together within fulfillment workflows to implement any type of required order-fulfillment program.

According to one embodiment, the fulfillment workflows of fulfillment programs (including common and/or custom business processes) defined by the designer 132 at the process design system 128 are transmitted (i.e., deployed) to the fulfillment management and applications server 102 and stored in the store database 112, to be executed by the order fulfillment management engine 202.

Once the order fulfillment workflows of fulfillment programs are deployed at the order fulfillment management engine 202, the order fulfillment system 100 of a retail store awaits orders from the order management system 116. According to one embodiment, the order management system 116 receives orders primarily from a website associated with the retail store. The order management system 116 sends a fulfillment order in a message 210 to the order fulfillment management engine 202. According to one embodiment, the order management system 116 also transmits a signal 216 including system configuration metadata to the order fulfillment management engine 202.

Based on the type of received order, the order fulfillment management engine 202 selects an appropriate predefined order fulfillment program and associated fulfillment workflow (from the database 112) to fulfill the received order. Based on the selected fulfillment program and associated order fulfillment workflow, the order fulfillment management engine 202 orchestrates execution of the associated fulfillment workflow by sending task requests 218 to the task management system 204, instructing the task management system 204 to execute the business processes (common and custom) associated with the order fulfillment workflow of the related fulfillment program. According to one embodiment, the task request 218 include information regarding which action 208 must be performed to execute the business process 206, 207 of the selected order fulfillment workflow. Upon receiving a task request 218 from the order fulfillment management engine 202, the task management system 204 enters the request into a task catalog 205. Each task request is associated with a specific business process 206, 207. Assignment of a task to an associate for execution may be subject of a set of rules based on multiple factors. For example, according to one embodiment, the factors may include, but are not limited to associate characteristics, the type of work performed by the associate, type and priority of the assigned task, and the location of the associate at the retail facility.

According to other embodiments, the management and/or assignment of tasks to implement business processes of one or more selected fulfillment workflows by the order fulfillment management engine may be performed as described in U.S. patent application Ser. No. 13/677,079 entitled "DYNAMIC TASK MANAGEMENT", filed on Nov. 14, 2012, which is herein incorporated by reference in its entirety.

According to one embodiment, an associate signs in to a portable device 104, connects to the task management system 204 via connection signals 224 and selects a type of work via task selection messages 222. According to another embodiment, the task management system 204 may automatically assign a work type based on characteristics of the associate (e.g., the associate role provided in the connection signals 224 via signal 226 transmitted by the task management system 204 to the task execution component 251 and the order fulfillment management engine 202. The task execution component 251 automatically requests assignment of a new task to the associate by sending a request 228 to the task management system 204. Upon receiving a request signal 228, the task management system 204 determines which task in the catalog 205 to assign to the associate and what business process 206, 207 should be executed based on the business rules defined in the prioritization agent 260 and the sequencing agent 264.

Upon assignment of a task, the task execution system 251 sends a message 240 that contains parameters that are needed to perform the task to the software module that implements the desired business process 206, 207. The software module that implements the business process 206, 207 executes a corresponding business process workflow, which in turn invokes associated actions 208. According to one embodiment, for each associate action 208, the corresponding software module generates screen content 246 that is displayed on the screen 105 of the portable device 104. Any associate input on the device 104, via scanning of an item or through entering using a keyboard 113, is passed to the software module that implements business process actions 208 for appropriate processing in a message 242. Task status updates are sent back to the business process execution system 251 and to the fulfillment management system 202. In another embodiment, the associate may inform the portable device 104 that the task is unable to be completed. In response to the information 242 provided by the associate to the portable device 104, a task or activity status update signal 244 is sent to the order fulfillment management engine 202 to update the engine 202 on which task(s) have or have not been completed.

According to one embodiment, based on the received task status update signals 244, the order fulfillment management engine 202 provides order status update signals 212 to the order management system 116. According to one embodiment, based on the received task status update signals 244, the order fulfillment management engine 202 may also send an order adjustment signal 214 to the order management system 116 (e.g., based on a task which is unable to be performed or is incomplete) to request adjustment of the order. According to one embodiment, the order fulfillment management engine 202 may also send data feeds 236 with performance metrics to the reporting component 114 regarding the performance of the order management system 100.

In response to an activity (or task) status update signal 244 indicating that a current task (or activity) associated with a business process 206, 207 has been completed, the portable device 104 may send a "task complete" signal 232 to the task management system 204. Also in response to a task status update signal 244 that indicates a current task or action associated with a business process 206, 207 has been completed, the portable device 104 may send a "next task" message 228 to the task management system 204 requesting another task associated with a desired business process 206 or 207. In response to the "next task" signal 228, the task management system 204 assigns another task and notifies the task execution system 251 via another task message 230.

According to one embodiment, the task management system 204 will continue to assign tasks to the task execution system 251 until there is no appropriate task left in the catalog 205 or the associate signs off of the task management system 204.

According to one embodiment, as described above, the administration system 106 is configured to allow a user 122 (e.g., a store manager in charge of the order fulfillment system 100) via an input device 107 (e.g., a keyboard, mouse or other input device) of the administration system 106 to control operation of the fulfillment system 100. A manager 122 can utilize an application provided by the administration system 106 to observe status of an order, assign employees to specific types of tasks, and perform other operations related duties. For example, according to one embodiment, the administration system 106 is configured to receive associate task information from the activity management system 204 via the Task Info signals 220, as well as operational information regarding the system 100 via operational information signals 234 from the fulfillment management engine 202. In another embodiment, the administration system 106 is configured to control operation of the fulfillment management engine 202 via operational control signals 238.

Various embodiments according to the present invention may be implemented on one or more computer systems or other devices. A computer system may be a single computer that may include a minicomputer, a mainframe, a server, a personal computer, or combination thereof. The computer system may include any type of system capable of performing remote computing operations (e.g., cell phone, PDA, tablet, smart-phone, set-top box, or other system). A computer system used to run the operation may also include any combination of computer system types that cooperate to accomplish system-level tasks. Multiple computer systems may also be used to run the operation. The computer system also may include input or output devices, displays, or data storage units. It should be appreciated that any computer system or systems may be used, and the invention is not limited to any number, type, or configuration of computer systems.

These computer systems may be, for example, general-purpose computers such as those based on Intel PENTIUM-type processor, Motorola PowerPC, Sun UltraSPARC, Hewlett-Packard PA-RISC processors, or any other type of processor. It should be appreciated that one or more of any type computer system may be used to partially or fully automate operation of the described system according to various embodiments of the invention. Further, the system may be located on a single computer or may be distributed among a plurality of computers attached by a communications network.

Figure 3:
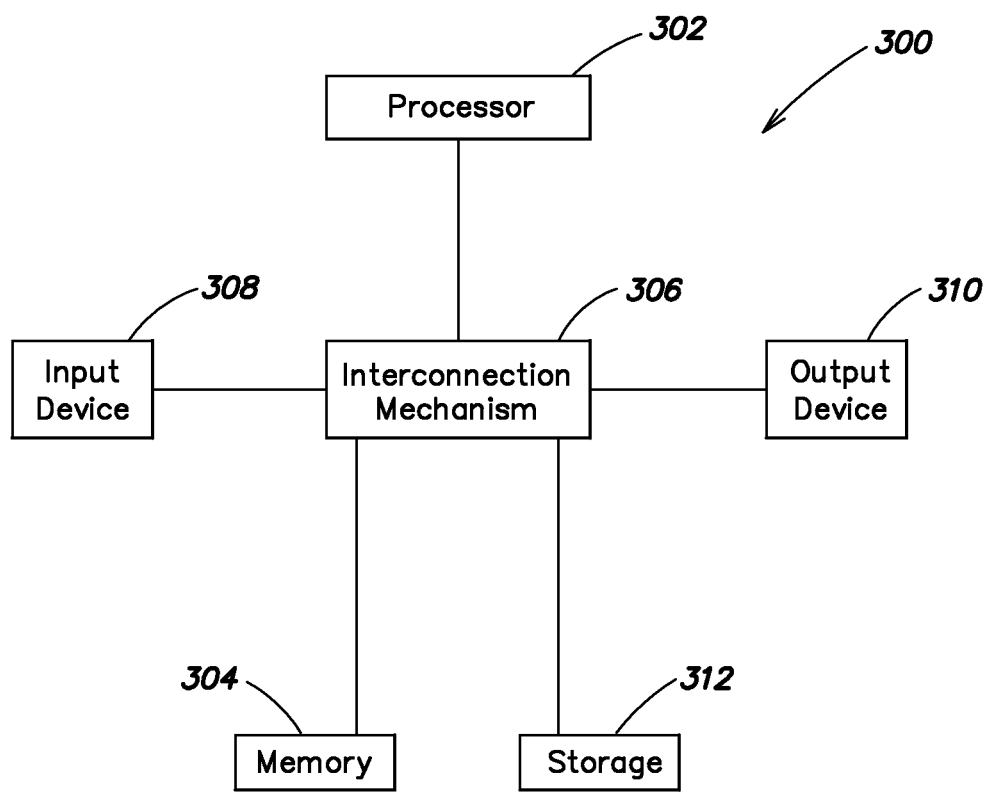
FIG. 3 is a block diagram of a general-purpose computer system upon which various embodiments of the invention may be implemented.

For example, various aspects of the invention may be implemented as specialized software executing in a general-purpose computer system 300 such as that shown in FIG. 3. The computer system 300 may include a processor 302 connected to one or more memory devices (i.e., data storage) 304, such as a disk drive, memory, or other device for storing data. Memory 304 is typically used for storing programs and data during operation of the computer system 300. Components of computer system 300 may be coupled by an interconnection mechanism 306, which may include one or more busses (e.g., between components that are integrated within a same machine) and/or a network (e.g., between components that reside on separate discrete machines). The interconnection mechanism 306 enables communications (e.g., data, instructions) to be exchanged between system components of system 300. Computer system 300 also includes one or more input devices 308, for example, a keyboard, mouse, trackball, microphone, touch screen, and one or more output devices 310, for example, a printing device, display screen, and/or speaker. In addition, computer system 300 may contain one or more interfaces (not shown) that connect computer system 300 to a communication network (in addition or as an alternative to the interconnection mechanism 306).

Figure 4:
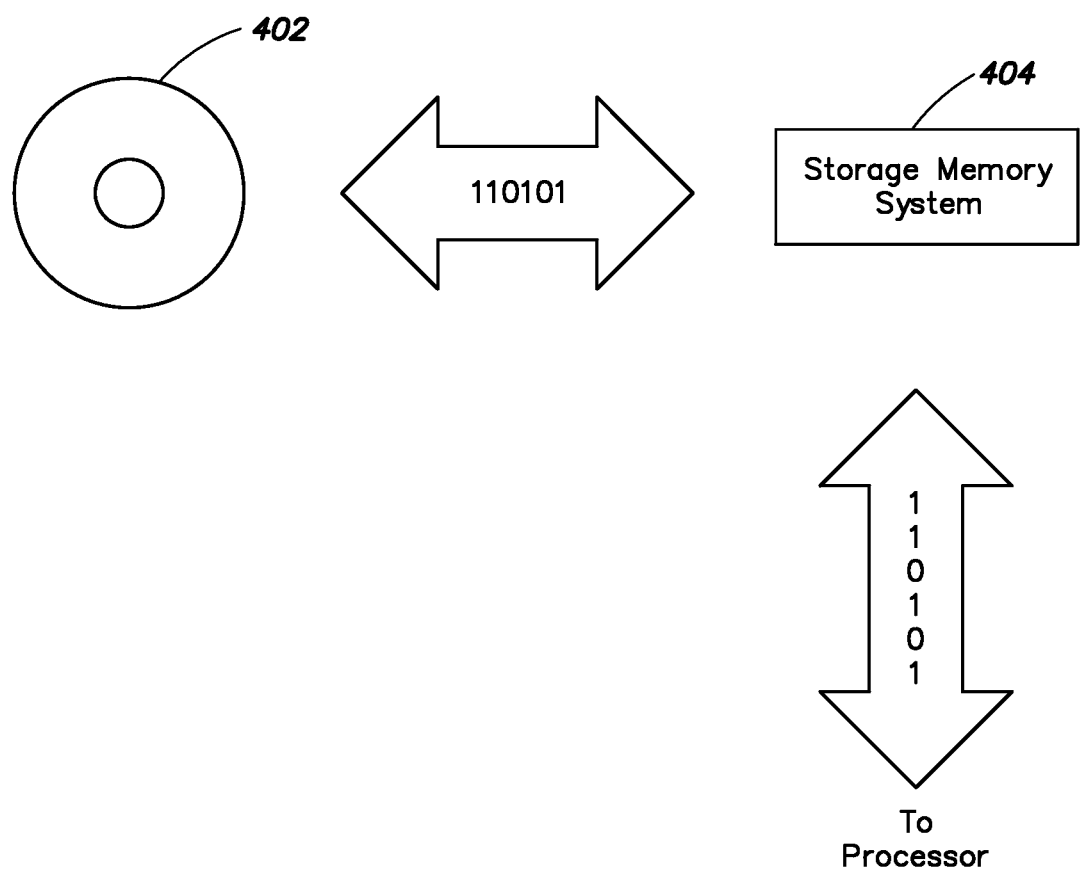
FIG. 4 is a block diagram of a computer data storage system with which various embodiments of the invention may be practiced.

The storage system 312, shown in greater detail in FIG. 4, typically includes a computer readable and writeable nonvolatile recording medium 402 in which signals are stored that define a program to be executed by the processor or information stored on or in the medium 402 to be processed by the program. The medium may, for example, be a disk or flash memory. Typically, in operation, the processor causes data to be read from the nonvolatile recording medium 402 into another memory 404 that allows for faster access to the information by the processor than does the medium 402. This memory 404 is typically a volatile, random access memory such as a dynamic random access memory (DRAM) or static memory (SRAM). It may be located in storage system 312, as shown, or in memory system 304. The processor 302 generally manipulates the data within the integrated circuit memory 304, 404 and then copies the data to the medium 402 after processing is completed. A variety of mechanisms are known for managing data movement between the medium 402 and the integrated circuit memory element 304, 404, and the invention is not limited thereto. The invention is not limited to a particular memory system 304 or storage system 312. The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component. Although computer system 300 is shown by way of example as one type of computer system upon which various aspects of the invention may be practiced, it should be appreciated that aspects of the invention are not limited to being implemented on the computer system as shown in FIG. 3. Various aspects of the invention may be practiced on one or more computers having a different architecture or components that that shown in FIG. 3. Computer system 300 may be a general-purpose computer system that is programmable using a high-level computer programming language. Computer system 300 may be also implemented using specially programmed, special purpose hardware. In computer system 300, processor 302 is typically a commercially available processor such as the well-known Pentium class processor available from the Intel Corporation. Many other processors are available. Such a processor usually executes an operating system which may be, for example, the Windows XP, Windows Vista, Windows 7, or Windows 8 operating systems available from the Microsoft Corporation, MAC OS System X operating system or an iOS operating system available from Apple Computer, one of many Linux-based operating system distributions, for example, the Enterprise Linux operating system available from Red Hat Inc., or UNIX available from various sources. Many other operating systems may be used. The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems (not shown) coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems. Also, it should be appreciated that the invention is not limited to any particular distributed architecture, network, or communication protocol. Various embodiments of the present invention may be programmed using an object-oriented programming language, such as Java, C++, Ada, or C #(C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof.

As described above, the use of common business processes to define fulfillment workflows is performed in relation to fulfillment programs of an order-fulfillment system; however, in other embodiments, fulfillment workflows defined by common business processes and driven by a single engine may also be utilized in other systems where multiple process flows must be configured and managed.

As described above, most server-based components of the fulfillment management system 100 are operated using servers located at a retail store; however, in other embodiments, where a store does not have the technological capability to operate the order management system within the store for example, some server-based components of the fulfillment management system may be operated at a central location (e.g., a data center or a central control station) and instructions from the server may be transmitted (e.g., via a network) to each individual required store. As also described above, the process design system 128 provides fulfillment workflows and associated business process workflows to the fulfillment management & applications server 102 of a retail store; however, in other embodiments, the process design system 128 may provide fulfillment workflows and associated business process workflows to any number of different stores. In such an embodiment, the process design system 128 may provide different fulfillment workflows and associated business process workflows to each one of the different stores, depending on the requirements of each store and the fulfillment programs they support.

As described herein, a designer of workflows for a fulfillment program may select from a group of predefined common business processes stored on the database of the process design system. According to some embodiments, the predefined common business processes may be preloaded on the database, downloaded to the database from a local or non-local source; transmitted to the database, or transferred to the database by any other appropriate method. By utilizing predefined fulfillment workflows that integrate common business processes, the flexible order fulfillment management system described herein may be able to drive store-based fulfillment programs more efficiently as multiple fulfillment workflows may utilize the same common business processes and a single fulfillment management system may operate the workflows in parallel. In addition, such an order fulfillment management system may also be more easily adapted for a variety of different retail store environments and situations, as the engine allows a user to easily create or modify a fulfillment workflow by selecting desired predefined common business processes and creating any additional custom business processes which may be required.

What is claimed is:

1. An order fulfillment system comprising:
a fulfillment management engine coupled to a task management system, wherein the task management system is configured to:
transmit a first signal that causes at least one portable electronic device to display an instruction to a user of the at least one portable electronic device to perform a first task of a first group of tasks associated with a plurality of predefined common business processes of a first selected predefined fulfillment workflow, wherein the first signal causes the at least one portable electronic device of the user to display the first task of the first group of tasks on a graphical user interface of the at least one portable electronic device;
obtain a task status update based on a user-entered input into the at least one portable electronic device of the user while the user is performing the first group of tasks associated with the plurality of predefined common business processes of the first predefined fulfillment workflow, and, in response to the obtained data, determine a location of the at least one portable electronic device during entry of the user-entered input;
determine, based on the location of the at least one portable electronic device of the user, that the user is located such that the user is available to perform a first task of a second group of tasks associated with the plurality of predefined common business processes of a second predefined fulfillment workflow; and
in response to this determination by the task management system, transmit a second signal to the at least one portable electronic device, wherein the second signal causes the at least one portable electronic device to no longer display the first task of the first group of tasks within the graphical user interface, but instead to:
display an instruction to the user of the at least one portable electronic device to interrupt the first group of tasks associated with the plurality of predefined common business processes of the first predefined fulfillment workflow, and to perform the first task of the second group of tasks associated with the plurality of predefined common business process of the second predefined fulfillment workflow, and
display the first task of the second group of tasks.

2. The order fulfillment system of claim 1,
wherein the first selected predefined fulfillment workflow including a first group of predefined common business processes and the second predefined fulfillment workflow including a second group of predefined common business processes, and
wherein both the first and second group of predefined common business processes include at least one same common business process.

3. The order fulfillment system of claim 1, wherein at least one predefined fulfillment workflow includes at least one custom business process and wherein the task management system is further configured to cause the at least one portable electronic device to instruct the user of the at least one portable electronic device to perform tasks associated with the common and custom business processes of the at least one predefined fulfillment workflow.

4. The order fulfillment system of claim 1, wherein the at least one device is a portable device configured to display instructions to the user to cause the user to perform tasks associated with the common business processes of the selected predefined fulfillment workflow.

5. The order fulfillment system of claim 4, wherein the at least one portable electronic device is a handheld device configured to display instructions to the user to cause the user to perform the at least one task associated with the common business processes of the selected predefined fulfillment workflow.

6. The order fulfillment system of claim 4, wherein the order fulfillment management engine is configured to operate two or more portable electronic devices simultaneously to instruct users of the two or more portable devices to perform tasks corresponding to business processes of one or more predefined fulfillment workflows.

7. The order fulfillment system of claim 4, wherein the instructions displayed on the at least one portable electronic device are based on at least one of a characteristic of the user, the current task being performed by the user, the predefined fulfillment workflow currently being driven, or a time sensitive nature of at least one order being fulfilled by the predefined fulfillment workflow.

8. The order fulfillment system of claim 1, wherein the task management system is further configured to identify the user based, at least in part, on a characteristic of the user.

9. The order fulfillment system of claim 8, wherein the characteristic of the user includes at least one of a qualification of the user and a location of the user.

10. The order fulfillment system of claim 1, wherein the task management system is further configured to identify the user based, at least in part, on a characteristic of a received order.

11. The order fulfillment system of claim 10, wherein the characteristic of the received order includes at least one of a time characteristic, environmental characteristic, and temperature characteristic of the received order.

12. The order fulfillment system of claim 1, wherein the task management system is further configured to assign tasks to a user based, at least in part, on a characteristic of the user.

13. The order fulfillment system of claim 1, wherein the task management system is further configured to assign tasks to a user based, at least in part, on a time requirement of an order.

14. The order fulfillment system of claim 1, the system further comprising:
an input device; and
a process design system coupled to the input device, the process design system configured to allow a user of the input device to define a plurality of fulfillment programs by arranging a group of the plurality of predefined common business processes as a sequence of steps, for at least a portion of each one of the plurality of fulfillment programs.

15. The order fulfillment system of claim 14, wherein the process design system is further configured to be coupled to the order fulfillment management engine and to deploy the plurality of fulfillment programs to the order fulfillment management engine.

16. The order fulfillment system of claim 14, wherein the order fulfillment management engine is configured to drive two or more predefined fulfillment workflows of two or more fulfillment programs in parallel to fulfill multiple orders.

17. The order fulfillment system of claim 14, wherein each one of the plurality of fulfillment programs is defined by the user as one of the plurality of predefined fulfillment workflows including the arranged group of the plurality of common predefined business processes.

18. The order fulfillment system of claim 17, wherein the plurality of predefined common business processes includes a first predefined common business process including a first set of tasks,
   wherein the plurality of fulfillment programs includes a first fulfillment program defined by a first fulfillment workflow including a first group of predefined common business processes and a second fulfillment program defined by a second fulfillment workflow including a second group of predefined common business processes, and
   wherein both the first and second groups of predefined common business processes include the first predefined common business process.

19. The order fulfillment system of claim 17, wherein the process design system is further configured to allow a user of the input device to define the fulfillment workflow of at least one of the plurality of fulfillment programs by selecting at least one custom business process and at least one of the plurality of predefined common business processes.

20. The order fulfillment system of claim 1, wherein a fulfillment workflow includes at least one of a pick business process, an audit business process, a load business process, a pack business process, a stage business process, a ship business process, a deliver business process, or a pickup business process.

* * * * *